July 2, 1935.  H. MALLER  2,006,901
PISTON PACKING
Filed Dec. 18, 1934
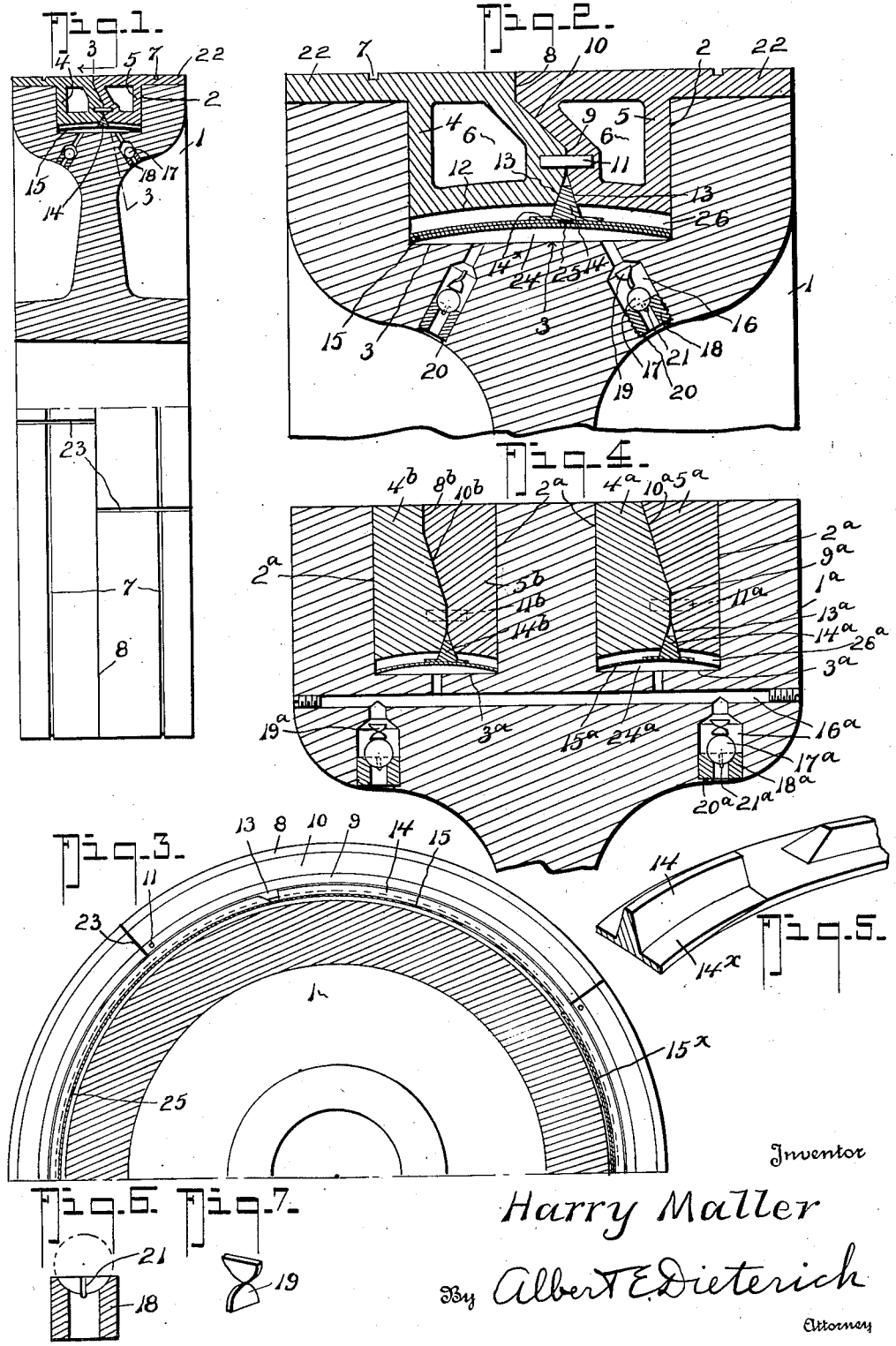
Inventor
Harry Maller
By Albert E. Dieterich
Attorney Patented July 2, 1935

2,006,901

UNITED STATES PATENT OFFICE 2,006,901

PISTON PACKING

Harry Maller, Omaha, Nebr.

Application December 18, 1934, Serial No. 758,125

10 Claims. (Cl. 309—26)

My invention relates to means for packing pistons and has especially for its object to provide a piston packing composed of rings and a combined resilient and fluid operated ring expanding means of such construction that the piston packing will automatically expand and the packing rings proper will be forced against the cylinder wall and against the side walls of the piston groove, or grooves, to form thereby a practically solid piston head in order to stop piston slap.

Further, it is an object to provide piston packing means of such construction and cooperation of parts that when the engine is drifting, pressure on the rings will be released or reduced to a minimum, and consequently wear on the piston rings will be reduced to a minimum.

Further, it is an object to provide means to utilize the motive fluid of the engine during the working strokes of the piston to insure the tightening of the packing rings without substantial escape of the working fluid through or around the piston rings.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Figure 1 is a part elevation and part vertical central longitudinal sectional view illustrating one embodiment of the invention.

Figure 2 is an enlarged detail cross sectional view of a portion of the structure illustrated in Figure 1.

Figure 3 is a sectional view on the line 3—3 of Figure 1.

Figure 4 is a view similar to Figure 2, showing a modified construction of the piston and two modifications of the packing rings proper.

Figure 5 is a detail perspective view showing the overlapping ends of the wedge ring.

Figure 6 is a detail sectional view of one of the valve seats showing the bleeding port.

Figure 7 is a detail perspective view of one of the valve stops used to prevent the valve becoming seated against the far side of the valve chamber so that the valve will be a one way valve only.

In the drawing, in which like numerals and letters of reference indicate like parts in all the figures, 1 represents the piston which has a ring groove providing parallel walls 2 and an inner annular wall 3 for the reception of the packing means. The packing ring proper consists of two split or segmental rings 4 and 5, respectively, which may be hollowed out or chambered as at 6 to reduce weight. These rings 4 and 5 may be flanged as at 22 to constitute a face for the piston and these faces may be provided, if desired, with oil grooves 7. The adjacent faces of the rings proper, 4 and 5, are provided with parallel radial portions 8 and 9 united by inclined or beveled portions 10, thereby constituting what I term interfitting faces. The rings 4 and 5 are also connected together to prevent swiveling by means of suitable dowel pins 11. When the rings 4 and 5 are made up of several sections a number of dowel pins may be used so that the splits 23 of adjacent rings 4 and 5 will be held out of alignment at all times. The inner faces of the rings 4 and 5 are concaved as at 12, and there is provided on each ring 4 and 5, within the compass of the surfaces 9, oppositely inclined surfaces 13 which constitute between them a V-shaped or wedge groove in which is fitted a wedge ring 14. The wedge ring 14 is preferably made of resilient metal so that it continuously tends to expand and thereby force the packing ring members 4 and 5 radially outward and laterally to cause them to press against the surfaces 2 and against the cylinder wall (not shown).

In order to assist the function of the wedge ring 14 and to apply fluid pressure against the inner walls of the rings 4 and 5, I provide a thin, flexible, preferably resilient, metallic ring 15, which is composed of a band the ends of which are lapped, as indicated in Figure 3 at 15x, so that the ring 15 may be expanded. The ring 15 is of concavo-convex form in cross section (see Figures 1, 2 and 4), being bowed outwardly, and it is of a width somewhat greater than the width of the groove 2 so that its sides will engage the walls 2 at all times and prevent the escape of fluid from the space 24 through the groove 2 and between the rings 4 and 5 outwardly. The ring 15 is preferably spot-welded, as at 25, to the flange 14x of the wedge ring 14 so that the two constitute a unit.

Fluid is admitted to the space 24 from the pressure side of the piston through fluid passages 16 containing valve seat members 18 and one way valves 17, a valve stop 19 being provided to prevent the valve 17 from closing the passage 16 on the outgoing side thereof. The valve seat member 18 may be held in the passage 16 by retaining friction or by threading the same into the passage (see Figure 2) and held against accidental removal by upsetting a portion of the piston wall as at 20.

The valve seat member 18 is preferably provided with a suitable bleeding port or groove 21 of relatively small cross section so that the fluid pressure in the chamber 24 will slowly bleed away when working pressure is no longer applied to the ends of the piston.

It will also be noted that the expansible, flexible, resilient, metallic ring 15 is spaced from the concaved wall 12 to leave a space 26 which serves as a pneumatic cushion and distributes the fluid pressure in space 24 through the ring 25 over the surface 12 to aid in forcing the piston rings 4 and 5 into contact with the cylinder wall.

It will be seen that the ring 22 can wear down considerably before it becomes useless. The inclined surfaces 10 aid in maintaining tight contact between the rings 4 and 5 and the walls 2. The pressure of the fluid in the space 24 tends to expand the ring 15 radially and consequently presses the side edges of the ring into correspondingly tighter engagement with the walls 2, thereby effectively preventing the passage of the pressure fluid from space 24 past the ring 15 and into the space 26 in any substantial amount.

When the engine is running idle, as when a locomotive employing the invention is coasting down hill, the pressure in space 24 gradually reduces by the bleeding off of the fluid through the bleeding port 21. If the pressure in space 26 then exceeds that in space 24 the flexibility of the ring-diaphragm 15 allows the fluid in space 26 to pass back around the sides of the ring 15 into the space 24 until the pressure in spaces 24 and 26 becomes substantially equal. Thus the degree of cushioning under operating conditions is maintained substantially constant. Reduction of the pressure in space 24 also permits the rings 15 and 14 to contract, thereby relieving the pressure on rings 4 and 5 so that wear on the rings due to pressure contact between the rings and the cylinder wall is taken off while the piston is running idle.

In Figure 4 I have shown a modification of the invention in which the piston is provided with two sets of ring grooves in which grooves packing rings of a somewhat different form are shown. In this figure all parts which correspond in purpose and function to parts in the preceding figures bear the same reference numerals plus the index letter "a" or "b", as the case may be. The assemblage of parts shown in Figure 4 may be employed, or the rings in each groove may be of identical form, as desired: namely, either that of the rings 4a, 5a, or that of the rings 4b, 5b.

What I claim is:

1. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible metallic expansible ring located in said annular ring groove within the compass of said wedge ring, said flexible metallic ring being concavo-convex in cross section and having its side edges in contact with the sides of the ring groove of the piston.

2. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible and resilient metallic expansible ring located in said annular ring groove within the compass of said wedge ring, said flexible metallic ring being concavo-convex in cross section and having its side edges in contact with the sides of the ring groove of the piston.

3. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible metallic expansible ring located in said annular ring groove within the compass of said wedge ring secured thereto, said flexible metallic ring being concavo-convex in cross section and having its side edges in contact with the sides of the ring groove of the piston.

4. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible metallic expansible ring located in said annular ring groove within the compass of said wedge ring, said flexible metallic ring being concavo-convex in cross section and having its side edges in contact with the sides of the ring groove of the piston, and means to lead fluid to the ring groove within the compass of said flexible metallic ring for expanding said flexible metallic ring radially outward for purposes described.

5. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible metallic expansible ring located in said annular ring groove within the compass of said wedge ring secured thereto, said flexible metallic ring being concavo-convex in cross section and having its side edges in contact with the sides of the ring groove of the piston, and means to lead fluid to the ring groove within the compass of said flexible metallic ring for expanding said flexible metallic ring radially outward for purposes described.

6. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible metallic expansible ring located in said annular ring groove within the compass of said wedge ring, said flexible metallic ring being concavo-convex in cross section and having its side edges in contact with the sides of the ring groove of the piston, said piston having a passage from the outside thereof to the ring groove with in the compass of said flexible metallic ring whereby the piston's motive fluid will serve to expand said flexible metallic ring, a back check valve for said passage, said piston having a bleeding port slowly to exhaust fluid from said ring groove.

7. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible metallic expansible ring located in said annular ring groove within the compass of said wedge ring and secured thereto, said flexible metallic ring being concavo-convex in cross section and having its side edges in contact with the sides of the ring groove of the piston, said piston having a passage from the outside thereof to the ring groove within the compass of said flexible metallic ring whereby the piston's motive fluid will serve to expand said flexible metallic ring, a back check valve for said passage, said piston having a bleeding port slowly to exhaust fluid from said ring groove.

8. A piston having an annular ring groove with side walls and a bottom annular wall, a pair of packing rings arranged side by side in said groove and having interfitting opposing surfaces, said rings having between them at the inner side a wedge shaped groove, a wedge ring within said annular ring groove and projecting into said wedge groove, a flexible metallic expansible ring located in said annular ring groove within the compass of said wedge ring and secured thereto, said flexible metallic ring being concavo-convex in cross section and having its side edges in contact with the sides of the ring groove of the piston, said piston having a passage from the outside thereof to the ring groove within the compass of said flexible metallic ring whereby the piston's motive fluid will serve to expand said flexible metallic ring, a back check valve for said passage, said piston having a bleeding port slowly to exhaust fluid from said ring groove, said bleeding port being located in the valve seat of said back check valve.

9. A piston having an annular ring groove with side walls and a bottom annular wall, a pair of packing rings arranged side by side in said groove, and having interfitting opposing surfaces, said rings having inclined walls constituting between them at the inner portion a wedge shaped groove, a wedge ring located within said annular groove and projecting into said wedge groove, a flexible and resilient metallic band located within the compass of said wedge ring and within said ring groove, having its ends overlapped to constitute an expansible ring, said flexible metallic ring being spaced from the inner faces of said packing rings to provide a cushion fluid space, said flexible metallic ring being spaced from the inner annular wall of the ring groove but having its sides contacting the side walls of the ring groove, and means for leading fluid under pressure into the ring groove space between the inner annular wall of the ring groove and said flexible metallic ring.

10. A piston having an annular ring groove with side walls and a bottom annular wall, a pair of packing rings arranged side by side in said groove, and having interfitting opposing surfaces, said rings having inclined walls constituting between them at the inner portion a wedge shaped groove, a wedge ring located within said annular groove and projecting into said wedge groove, a flexible and resilient metallic band located within the compass of said wedge ring and within said ring groove, having its ends overlapped to constitute an expansible ring, and flexible metallic ring being spaced from the inner faces of said packing rings to provide a cushion fluid space, said flexible metallic ring being spaced from the inner annular wall of the ring groove but having its sides contacting the side walls of the ring groove, means for leading fluid under pressure into the ring groove space between the inner annular wall of the ring groove and said flexible metallic ring, and means for bleeding the fluid from said ring groove upon passage of the applied fluid pressure.

HARRY MALLER.